United States Patent Office 3,189,486
Patented June 15, 1965

3,189,486
PRIMARY ELECTRIC CELL
Michael J. Pryor and Douglas S. Keir, Hamden, and Philip R. Sperry, North Haven, Conn., assignors to Olin Mathieson Chemical Corporation, a corporation of Virginia
No Drawing. Filed Jan. 14, 1963, Ser. No. 251,024
7 Claims. (Cl. 136—100)

This is a continuation-in-part of United States patent application Serial No. 60,166, filed October 3, 1960, and United States patent application Serial No. 171,114, filed February 5, 1962.

The present invention relates to improved aluminum anodes. More particularly, the present invention relates to improved aluminum anodes which may be advantageously utilized in a number of applications, for example, (1) in primary electric batteries suitable for use with liquid electrolytes, such as aqueous electrolytes and especially sea water, and (2) as sacrificial aluminum anodes in conjunction with a metallic cathode which thereby receives substantial protection against corrosion.

Magnesium and magnesium alloys in the form of sheet are generally used as the anodes of electric cells or batteries adapted to utilize sea water or similar aqueous electrolytes. These batteries are small, portable power sources which are used for such applications as driving torpedoes, powering sonar devices, etc. The electrolyte is usually sodium chloride solution or sea water. These cells use consumable cathodes of a silver salt, generally fused solidified silver chloride. During the operation of the cell the magnesium anode is oxidized to magnesium ions in solution and the silver chloride cathode is reduced to metallic silver. Construction of these batteries generally involves a number of these primary electric cells in series.

The aforementioned battery ordinarily operates for relatively short periods of time before being subsequently exhausted, generally not more than 5 to 10 minutes, during which time they develop a high power output per unit of weight and volume when immersed in sea water. Naturally with appreciable construction changes, batteries may be prepared which will give lower power output for longer periods of time.

The cost of these conventional sea water batteries has been found to be prohibitively high except for military applications. This prohibitively high cost is due in part to the high price of magnesium and also especially to the difficulty in rolling the hexagonal metal down to light gage sheet of less than 0.020 inch thicknes.

Further disadvantages of magnesium include the fact that it corrodes readily in saline mediums even when uncoupled to readily reducible cathodes, attains relatively low power efficiency on the order of about 60 percent, is accompanied by a marked hydrogen-evolution problem due to local action of the electrolyte on the anode itself, and is characterized in combination with silver chloride and sea water by a power output which falls with time and for which special design allowances must be made.

Zinc is disadvantageous, inter alia, as it provides insufficient power output to be a useful anode material in this type of power cell.

The more widely used sacrificial anodes for protection of ferrous structures against corrosion are the zinc and magnesium anodes. Aluminum alloys have not been as widely adopted for this purpose as the zinc and magnesium anodes because they have previously produced only low protective currents equivalent to those generated by zinc anodes but at a much higher unit cost. Furthermore, aluminum alloys have frequently shown the characteristic of becoming highly polarized due to the accumulation of insoluble corrosion products so that ultimately little useful protective current is delivered. However, both the zinc and magnesium are subject to serious disadvantages, for example, since magnesium depresses the potential of steel in sea water into the hydrogen evolution range, stripping of protective coatings from the steel can result. Furthermore, magnesium itself produces copious quantities of hydrogen when it serves as an anode in sea water. This is of particular significance in connection with protection of sea water ballast tanks in ships for which purpose magnesium anodes have been found to be hazardous. Zinc is undesirable due to the low galvanic currents delivered.

It is therefore an object of the present invention to provide an improved aluminum alloy having a wide variety of uses, for example, which is capable of being utilized as a sacrificial anode and in an improved electric cell or battery adapted to utilize sea water or other electrolytes.

It is a further object of the present invention to provide an improved battery as aforesaid which attains high average current density, high power output and high current potential.

It is a still further object of the present invention to provide an improved battery as aforesaid which is inexpensive and economical while still attaining excellent results.

It is a still further object of the present invention to provide an improved cathodic protection system and an improved method of cathodically protecting a ferrous metal structure in contact with a medium corrosive thereto.

In accordance with the present invention it has been found that the foregoing objects and advantages may be readily accomplished by providing a metal anode comprising an aluminum base alloy containing at least 90.0 percent aluminum and between 0.04 and 0.5 percent tin.

An additional advantage of the alloys of the present invention is that they can be readily fabricated by casting by either hot or cold rolling, and can be readily rolled to small gages desirable for power cell anodes in distinction to magnesium where its hexagonal lattice severely restricts its fabricating.

In accordance with the present invention it has now been further found that an improved primary cell may be obtained which comprises the above metal anode, a consumable, unpolarized cathode and a liquid electrolyte. The improved primary cell preferably utilizes as cathode a readily reducible and suitably insoluble metal salt or oxide, for example, silver chloride or copper oxide, and an aqueous electrolyte.

It has been further found in accordance with the present invention that an improved cathodic protection system may be provided comprising a cathodic metal structure and at least one aluminous sacrificial anode electrically connected thereto, both the metal structure and the anode being in contact with a medium corrosive to said metal structure, said anode comprising the above aluminum alloy of the present invention.

The improved aluminum base alloy of the present invention contains tin in an amount from 0.04 to 0.5 percent and at least 90.0 percent aluminum. Preferably the tin is retained in solid solution to the maximum degree, i.e., about 0.1 percent, with the excess tin, or a suitable third ingredient, being provided as taught in the above-identified co-pending application Ser. No. 60,166 to improve uniformity of corrosion and to improve anodic efficiency.

The preferred manner of preparing this alloy is to heat the aluminum tin sample at elevated temperatures, e.g., around 620° C.±20° C. for a sufficient period of time to dissolve the maximum amount of tin and to redistribute excess tin or other alloying additions in a coarse, particulate form which produces maximum uniformity of attack and power efficiency. Generally, the heating period within the preferred temperature range may vary between 15 minutes and 24 hours. After the heating period, the sample is cooled rapidly, for example, by immersion in a large volume of water at ambient temperatures. For simplicity, this treatment may be termed "homogenization treatment."

It has been found, as discussed in detail in the above co-pending applications, that the alloys of the present invention develop surface layers on oxidation of any portion thereof, which surface layers have an excess of n-type defects in a concentration effective to substantially increase the conductivity thereof.

In accordance with the present invention, it has been found that by utilizing an aluminum base alloy containing from 0.04 to 0.5 percent tin in aluminum, a greatly improved alloy may be obtained, especially for use as an anode in an improved primary cell and as a sacrificial anode.

In accordance with the present invention it has been found that the preferred amounts of tin in the alloy are from 0.08 to 0.35 percent. In some instances high purity aluminum may be preferred, for example, in the primary cells; however, the present invention is not limited to the use of high purity aluminum and the improved alloy of the present invention may be prepared from lower purity aluminum containing from about 0.001 to 0.05 percent silicon and from about 0.001 to 0.1 percent iron.

It should be further understood that the alloy of the present invention may contain in addition to the aluminum and tin and the impurities, other metal components. These additional components may be added to achieve particularly desirable results.

Generally, insoluble elements may be added to the alloy, i.e., elements which have less than 0.03 percent maximum solid solubility in aluminum. The total amount of these insoluble elements should be no greater than 0.5 percent. These insoluble elements have no significant effect on current output as they do not reduce the solid solubility of tin in aluminum, but they act as second phase particulate cathodes and large amounts ultimately reduce anodic efficiency by promoting local corrosion of the anode.

Soluble elements may also be added to the alloy. The soluble elements may be considered either lattice expanders or lattice contractors, i.e., ternary addition elements which either expand or contract the aluminum lattice. Generally lattice expanders stabilize tin in retained solid solution and permit high galvanic currents to be drawn from the alloy. Lattice expanders may be used in an amount from about 0.001 to 8 percent, with typical lattice expanders and amounts thereof which may be used including: magnesium from about 0.001 to 7.0 percent; zirconium from about 0.001 to 0.3 percent; bismuth from about 0.001 to 0.3 percent; indium from about 0.001 to 0.5 percent; and mixtures thereof.

Lattice contractors generally reject tin from solid solution, but small amounts may be tolerated, for example, zinc from about 0.001 to 0.01 percent; copper from about 0.001 to 0.002 percent; silicon from about 0.001 to 0.05 percent; and manganese from about 0.001 to 0.05 percent.

The primary cell of the present invention employs a consumable unpolarized cathode, a liquid electrolyte and the improved metal anode of the present invention. As a cathode material any consumable and unpolarized cathode may be conveniently employed, and preferably a readily reducible and insoluble metal salt or oxide, for example, a silver salt or oxide or a copper salt or oxide.

In the primary cell of the present invention it is preferred to utilize solid, fused silver chloride as a cathode. Alternatively, any silver salt may be utilized as the cathode material, provided the salt is at least as soluble as silver chloride, but sufficiently insoluble to avoid disintegration of the cathode during operation of the cell. Among such other cathodic materials which may be employed are silver oxide, silver chromate, silver sulfate, silver phosphate, silver acetate and silver carbamate. Cells may be formed with cathodes of silver salts more insoluble than silver chloride such as silver bromide and silver iodide, but the voltage is considerably lower since the cathodic material is much more insoluble than the silver chloride. Exemplificative copper compounds include preferably copper oxides.

The electrolytes which may be employed are broadly any liquid electrolyte and preferably the liquid-aqueous type electrolytes. The electrolyte which should be employed should, in addition to being liquid at operating temperatures, be one which does not polarize the anode or the cathode and one free from inhibitive action on the anode.

The primary cell of the present invention is especially adapted to utilizing sea water as the electrolyte; however, it is apparent that the cells and batteries of the present invention will operate advantageously in electrolytes other than sea water, for example, any aqueous solution of sodium chloride may be conveniently employed, such as a 3.5 percent aqueous solution of sodium chloride. Similarly, other alkali metal chlorides or alkaline earth metal chlorides will be satisfactory. Other suitable electrolytes, weak or strong, dilute or concentrated may be conveniently employed. Water also yields an operative cell although a considerable time may be required before the cell reaches its full capacity. Exemplificative of the non-aqueous type electrolytes include fused sodium chloride or potassium chloride, including low melting alkali halide eutectics.

Naturally, the primary cell of the present invention may be prepared by any of the conventional means well known in the art. In the preparation of the primary cell of the present invention, for example, the anode and cathode material may be separated or spaced apart by any conventional means, for example, thin films of a chemically stable material such as nylon may be adhered to the anode material. If the particular cell or battery under consideration is intended to operate at a high current density, the electrodes should be more closely spaced. In a cell or battery not intended to operate at high current densities, close spacing is not required. In the low current density batteries, rubber strips or tabs at the edges of the electrode sheets may be employed.

The cathode material may be prepared by any of the conventional means, for example, cast sheets of substantial thickness may be employed or rolled silver chloride may be produced by suspending a body of silver, such as silver screen, in a dilute chloride solution for a time sufficient to form a silver chloride coating of the desired thickness. Other means for preparing the cathodic material are well-known in the art. It is preferred to set up a plurality of the primary cells spaced from one another so that individual cells are established between the plates of succeeding electrodes when immersed in an electrolyte.

In accordance with the present invention it has been surprisingly found that the primary cell of the present invention attains excellent short circuited current density of 2.03 amps/sq. inch and open circuit potential of about 1.5 volts. This compares with a short-circuited current density of 2.28 amps/sq. inch and an open circuit potential of 1.59 volts for a similar primary cell containing an anode of magnesium alloy AZ 61 (a magnesium alloy containing about 6 percent aluminum, 1 percent tin, 0.3 percent manganese and the balance magnesium). However, the power output of the primary cell containing the preferred aluminum-tin composition was 1.65 times greater for an equivalent amount of metal consumed than that of a similar power cell containing the magnesium alloy AZ 61 anode and the anodic efficiency was about 1.4 times higher. It was further demonstrated that there was about 25 percent less hydrogen evolution and about 30 percent less heat evolution for the primary cell of the present invention. Furthermore, the primary cell of the present invention provides a more desirable constantly rising current and power over the period of operation in contrast to the decaying current and power output in the primary magnesium cell. This disadvantage of primary cells containing magnesium anodes requires special and costly design remedies to maintain a constant power output with time.

It is one of the findings of the present invention that an improved cathodic protection system may be provided comprising a cathodic metal structure and at least one aluminous sacrificial anode electrically connected thereto, both the metal structure and the anode being in contact with a medium corrosive to said metal structure, said anode comprising the above aluminum alloy of the present invention.

The anodes of the present invention can be used in cathodic protection systems for underground structures, such as pipe lines, foundations and the like. They may be used in fresh water or in saline aqueous media. They are particularly well suited for use in sea water, and provide for the first time, cathodic protection systems for protection of iron, such as ships' hulls, ballast tanks, and commercial fishing devices, such as lobster pots, which are free from the shortcomings of previously used systems.

In carrying out the present invention, the sacrificial anode of the type previously described, is attached to a metal structure to be protected, such as, for example, a ferrous metal structure, by means of a suitable electrical conductor, and then immersed or imbedded in the surrounding corrosive medium, in accordance with the customary practice. The alloy anode may be of any desired shape or size, such as, for example, a cylindrical piece, or a trapezoidal shaped member.

In large scale cathodic protection tests, in which substantially higher anodic current densities were drawn, there was found on the anode a layer of metallic sponge enriched in tin and which was only in poor metallic contact with the core. This resulted in substantially lower anodic efficiencies.

Several ternary additions were found to be effective in alleviating this condition, for example, from 0.001 to 0.5 percent of a low hydrogen, overpotential element which can be tolerated in the aluminum-tin lattice in accordance with the above disclosure, such as silver, from about 0.06 to 0.08 percent; cobalt, from about 0.001 to 0.3 percent; bismuth, from about 0.001 to 0.3 percent; and indium, from about 0.001 to 0.5 percent; and mixtures thereof.

It has been found that effective prevention of sponge is disadvantageous because of a growing anodic polarization, with time, which limits the useful protective current to an undesirably low degree. Accordingly, it is preferred to use those low hydrogen, overpotential elements which reduce the amount of sponge to a low level, but which simultaneously produce small and controlled amounts of sponge, such as bismuth, from about 0.05 to 0.2 percent, and indium, from about 0.05 to 0.3 percent, and mixtures thereof.

The present invention and the improvements resulting therefrom will be more readily apparent from a consideration of the following illustrative examples.

EXAMPLE 1

This example describes a representative preparation of an aluminum alloy with 0.3 percent tin in the form of sheet suitable for the anode of a sea water battery test cell. The aluminum used was at least 99.995 percent pure and the alloying addition was pure tin. When analyzed after casting, this alloy contained 0.30 percent Sn, 0.0028 percent Fe, and less than 0.001 percent each of Si and Cu.

The ingot was given a homogenization heat treatment of 620° C. for 16 hours. However, in contrast to other homogenization heat treatments which are followed by quenching into water, this ingot was cooled in air to minimize the danger of cracking during subsequent rolling. Two parallel surfaces of the ingot were machined to give an initial thickness of 2⅝ inches. The ingot was then reheated to 400° C. for one hour and hot rolled to 0.25 inch, then air cooled. Some of this 0.25 inch sheet was reheated to 370° C. and hot rolled to 0.062 inch, air cooled, then cold rolled to 0.023 inch. Following the final rolling the sheet was homogenization heat treated at 620° C. for 4 hours and quenched into water.

EXAMPLE 2

In the following example three primary cells were prepared in an identical fashion except that the anodic material in primary cell A was prepared from homogenized alloy of super-purity aluminum (99.997%) containing 0.3 percent tin. The anodic material in primary cell B was prepared from 1100 aluminum alloy and the anodic material in primary cell C was prepared from magnesium alloy AZ 61.

The test primary cells were constructed in the conventional manner. The anodes were shaped from sheet material generally about 0.02 inch thick. The cathodes were shaped from silver chloride sheet about 0.015 inch thick. The cathodes were modified to incorporate insulating spacers which would allow them to be placed in close proximity to the anodes without electrical short circuiting. This was done, in one of the conventional art manners, by using glass beads fastened to one side of the sheet. A multiplicity of holes was drilled in the cathode to increase the reactive surface of the silver chloride. In addition, the silver chloride was partially reduced to silver in a conventional manner by immersion in a photographic film developer.

The electrical contact with the silver chloride cathode was furnished by a 0.001 inch thick 99.9 percent pure silver foil held in pressure contact in the conventional fashion. External electrical connections were made to the anode and cathode, suitably insulated from each other and from the electrolyte. The anode, cathode and spacers were then taped together to complete the cell structure.

Provisions were made for collecting and measuring hydrogen gas evolved during the reaction time, for measuring temperature rise in the electrolyte and for measuring the potential on open or closed circuit, the current on short circuit (negligible resistance) or with any suitable simulated load resistance.

The following results were obtained:

*Table 1*

|  | Primary cell A | Primary cell B | Primary cell C |
|---|---|---|---|
| Current output-amperes, per sq. inch: |  |  |  |
| (a) short circuited | 2.03 | 0.96 | 2.28 |
| (b) through a 1 ohm resistance | 0.48 | 0.23 | 0.51 |
| Open circuit voltage-volts | 1.49 | 0.78 | 1.59 |
| Power output-kw.-min./lb | 64.2 | 28.4 | 38.7 |
| Anodic efficiency-percent | 85.7 | 69.8 | 60.8 |
| Hydrogen evolution, cc./watt-min | 2.36 | 2.52 | 3.14 |
| Heat evolution, calories/min | 21.6 | 11.7 | 30.7 |
| Current/time characteristics, amps/sq. inch-min.: |  |  |  |
| (a) with 1 ohm resistance, between 2 min. and 22 min. of a 30 min. run | +0.0001 |  | −0.0053 |
| (b) with 0.3 ohm resistance, between 1 min. and 6 min. of 7.5 min. run | −0.02 |  | −0.10 |

As can be seen in the above table, the anodic efficiency of dissolution of the aluminum tin alloy was around 80 percent or better. The average efficiency of corrosion of magnesium is in the lower range of 60 to 65 percent. In addition, the superior anodic efficiency of the aluminum-tin alloy is evidenced by the fact that the hydrogen evolution rate in cc./watt-minutes is only 2.36 for aluminum-tin and is 3.14 for the commercial magnesium alloy. The difficulty of safely releasing hydrogen in a confined space is clearly less with the aluminium-tin composition than with the presently used magnesium.

The foregoing experiments demonstrate that the aluminum-tin alloy generates almost as much current when coupled with silver-chloride cathodes as does the magnesium; however, the power output per pound of aluminum is almost twice that of the magnesium alloy and since the anodic efficiency is substantially higher, lesser volumes of hydrogen are evolved from the aluminum-tin anodes. Furthermore, the highly favorable current, voltage and power characteristics of the alloy of the present invention facilitate maintaining constant power output during the useful life of the battery with the absence of expensive design features.

EXAMPLE 3

The procedure of Example 2 was repeated, with the exception that differing quantities of alloying materials were used in the anodic material of primary cell A. The results are shown in the following table.

*Table 2*

| Alloy | Current output, amperes per sq. inch, short circuited | Power output, kw.-min./lb. | Hydrogen evolution, cc./watt-min. |
|---|---|---|---|
| Al-0.1% tin | 1.84 | 62.5 | 1.76 |
| Al-0.2% tin | 1.9 | 67.4 | 2.46 |
| Al-0.3% tin | 2.03 | 64.2 | 2.36 |
| Al-0.2% tin-0.1% Bi | 1.83 | 56.9 | 2.08 |

The following examples relate to the cathodic protection system of the present invention.

EXAMPLES 4–7

In the following examples, specimens of a convenient size and shape for galvanic tests were cut and machined from the homogenized ingot. Each specimen had a 10 sq. cm. exposed surface area coupled to a sheet steel of equal area in a 0.1 N sodium chloride solution. The results are shown in the following table.

*Table 3*

| Example No. | Alloy | Coulombs flowing in 48 hrs. | Galvanic wt. loss of Al anode, mg./cm.² | Total Al wt. loss, mg./cm.² | Wt. loss due to local action, mg./cm.² | Overall efficiency, percent |
|---|---|---|---|---|---|---|
| 4 | Commercial Al pig containing as impurities less than 0.05% silicon and less than 0.1% iron, alloyed with 0.20% tin and 0.10 percent bismuth. | 794<br>817<br>912 | 7.4<br>7.6<br>8.5 | 14.9<br>16.2<br>19.3 | 7.5<br>8.6<br>10.8 | 50<br>47<br>44 |
| 5 | Commercial Al pig of Example 4 alloyed with 0.20% tin and 0.10% indium. | 807<br>928<br>920 | 7.5<br>8.7<br>8.6 | 13.4<br>17.4<br>15.6 | 5.7<br>8.7<br>7.0 | 56<br>50<br>55 |
| 6 | Commercial Al pig of Example 4 alloyed with 0.20% tin. | 924<br>914<br>955 | 8.6<br>8.5<br>8.9 | 26.3<br>26.0<br>26.3 | 17.7<br>17.5<br>17.4 | 33<br>33<br>34 |
| 7 | High purity aluminum alloyed with 0.20% tin. | 923<br>854 | 8.7<br>8.0 | 22.5<br>19.6 | 13.8<br>11.6 | 38<br>41 |

EXAMPLES 8–10

The following examples represent tests on a larger scale to simulate more closely the conditions under which anodes might be used in the cathodic protection of steel structures in sea water. These tests were conducted in polyethylene tanks 36 by 36 inches on each side filled with 3.4±0.2 percent by weight of sodium chloride in water to a depth of eight inches. The temperature was ambient room temperature, generally about 25° C. The cathode was 0.25 percent carbon steel, in accordance with ASTM standard A53–58T, in the form of a ring with a 10 inch inside diameter and 5 inches long. All surfaces, except the inside cylindrical surface, were coated with epoxy paint and provisions for electrical connections were made. The anode specimens were machined into cylinders and were 5 inches long and generally ½ inch in diameter. Only the cylindrical outer surface was exposed, the ends and the electrical connectors being protected with epoxy paint. The electrical connections gave provisions for completing the galvanic cell circuit with or without an external resistance and for measuring the potential and the current during the test. The tests were run for one week (168 hours). The anodes were weighed at the beginning of each test and again at the end, first after rinsing and drying and again after scraping or brushing off all of the loose, spongy corrosion product. The results are shown in the following table.

*Table 4*

| Example No. | Alloy | Coulombs flowing in 168 hrs. | Galvanic wt. loss of Al anode, gms. | Total Al wt. loss, gms. | Wt. loss due to local action, gms. | Overall efficiency, percent |
|---|---|---|---|---|---|---|
| 8 | Commercial Al pig containing as impurities less than 0.5% silicon and less than 0.1 percent iron, alloyed with 0.20 percent tin and 0.10 percent bismuth. | 116,000<br>102,500 | 10.841<br>9.579 | 34.793 | 25.214 | 27 |
| 9 | Commercial Al pig of Example 8 alloyed with 0.20% tin and 0.10% indium. | 117,000<br>128,500 | 10.934<br>12.009 | 36.445 | 25.511 | 30 |
| 10 | Commercial Al pig of Example 8 alloyed with 0.20% tin. | 69,800<br>69,700 | 6.523<br>6.514 | 33.037 | 26.523 | 20 |

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. In a primary electric cell containing a metal anode, a consumable unpolarized cathode, and a liquid electrolyte in contact with said anode and said cathode, the improvement wherein said metal anode is of an aluminium base alloy consisting essentially of at least 90 percent aluminum and between 0.04 and 0.5 percent tin with the tin being retained in solid solution to the maximum degree, said maximum degree being 0.1 percent.

2. A primary electric cell according to claim 1 wherein said aluminum base alloy contains between 0.08 and 0.35 percent tin.

3. A primary electric cell according to claim 1 wherein said electrolyte is sea water.

4. A primary electric cell according to claim 1 wherein said anode is an aluminum base alloy consisting essentially of at least 90 percent aluminum, between 0.04 and 0.5 percent tin with the tin being retained in solid solution to the maximum degree, said maximum degree being 0.1 percent, and from 0.001 to 8 percent of a lattice expander which has greater than 0.03 percent maximum solid solubility in aluminum.

5. A primary electric cell according to claim 4 wherein said lattice expander is selected from the group consisting of magnesium in an amount from 0.001 to 7.0 percent, zirconium in an amount from 0.001 to 0.3 percent, bismuth in an amount from 0.001 to 0.3 percent, indium in an amount from 0.001 to 0.5 percent.

6. A primary electric cell comprising a metal anode consisting essentially of at least 90 percent aluminum and from 0.04 to 0.5 percent tin with the tin being retained in solid solution to the maximum degree, said maximum degree being 0.1 percent, a consumable unpolarized cathode selected from the group consisting of a silver salt, a silver oxide, a copper salt, and a copper oxide, and an aqueous electrolyte in contact with said anode and said cathode.

7. In a primary electric cell containing a metal anode, a cathode, and a liquid electrolyte in contact with said anode and cathode, the improvement wherein said metal anode is of an aluminum base alloy consisting essentially of at least 90 percent aluminum and between .04 and .5 percent tin with the tin being retained in solid solution to the maximum degree, said maximum degree being 0.1 percent.

References Cited by the Examiner

UNITED STATES PATENTS

| | | | |
|---|---|---|---|
| 2,562,906 | 8/51 | Hadley | 136—100 |
| 2,565,544 | 8/51 | Brown | 204—148 |
| 2,590,584 | 3/52 | Taylor | 136—103 |
| 2,786,088 | 3/57 | Robinson | 136—83 |
| 2,953,620 | 9/60 | Smith et al. | 136—83 |
| 3,047,478 | 7/62 | Marsh et al. | 204—148 |
| 3,063,832 | 11/62 | Snyder | 75—138 |
| 3,069,336 | 12/62 | Waite et al. | 204—148 |

JOHN H. MACK, *Primary Examiner.*

MURRAY TILLMAN, *Examiner.*